(12) United States Patent
Sutherland et al.

(10) Patent No.: US 11,803,661 B1
(45) Date of Patent: Oct. 31, 2023

(54) COMPUTER-IMPLEMENTED SYSTEM AND METHOD FOR FACILITATING DATA SECURITY OF DOCUMENTS

(71) Applicant: Imagesource, Inc., Olympia, WA (US)

(72) Inventors: Terry Sutherland, Olympia, WA (US); Randy Weakly, Monument, CO (US)

(73) Assignee: ImageSource, Inc., Olympia, WA (US)

( * ) Notice: Subject to any disclaimer, the term of this patent is extended or adjusted under 35 U.S.C. 154(b) by 0 days.

(21) Appl. No.: 17/125,953

(22) Filed: Dec. 17, 2020

Related U.S. Application Data

(60) Provisional application No. 62/949,831, filed on Dec. 18, 2019.

(51) Int. Cl.
*G06F 21/62* (2013.01)
*G06F 16/34* (2019.01)
*G06F 40/169* (2020.01)
*G06F 40/106* (2020.01)

(52) U.S. Cl.
CPC ........ *G06F 21/6254* (2013.01); *G06F 16/345* (2019.01); *G06F 40/106* (2020.01); *G06F 40/169* (2020.01)

(58) Field of Classification Search
CPC .. G06F 21/6254; G06F 16/345; G06F 40/169; G06F 40/106
USPC .......................................................... 726/26
See application file for complete search history.

(56) References Cited

U.S. PATENT DOCUMENTS

| | | | | |
|---|---|---|---|---|
| 2007/0030528 A1* | 2/2007 | Quaeler | ................. | G06F 16/33 358/448 |
| 2009/0070664 A1* | 3/2009 | Gavin | ................. | G06F 40/169 715/234 |
| 2010/0205269 A1* | 8/2010 | Poozhiyil | ................ | G06F 40/18 709/206 |
| 2013/0272523 A1* | 10/2013 | McCorkindale | ......... | H04N 1/44 380/243 |
| 2013/0283189 A1* | 10/2013 | Basso | ..................... | G06F 16/93 715/753 |
| 2014/0012719 A1* | 1/2014 | Schrichte | ............... | G06Q 10/00 705/40 |

* cited by examiner

*Primary Examiner* — Hope C Sheffield
(74) *Attorney, Agent, or Firm* — Krista A. Wittman

(57) ABSTRACT

A computer-implemented system and method for facilitating document information security is provided. A request for documents is received and documents of different formats that satisfy the request are obtained from one or more sources. Source information is extracted from each obtained document. Each obtained document is converted to a common format and the source information is embedded within the common format for that document. At least a portion of text having sensitive data is identified within one or more of the obtained documents. The sensitive data is redacted by highlighting the text portion with a semi-transparent indicator. The highlighted text portion is obfuscated upon approval of the redacted sensitive data by changing the semi-transparent indicator to an opaque indicator. The redaction information is overlayed on the opaque indicator and the obtained documents are provided in response to the request.

19 Claims, 8 Drawing Sheets

Fig. 3.

Internal Documentation Request

Please provide documents that are relative to this request. If you have a large number of documents to contribute please copy them into the network folder specified below.

Notice: This request has already been completes. No additional documents can be contributed at this time.

Employee Email

61 — ****@imagesourceinc.com

Request Number

62 — 1539028245368

Request Type

63 —

Maximum of 100 characters allowed. *Currently entered: 0 characters.*

Request Summary

64 —

Additional record categories

65 —

66 — Please upload relevant content or attest that you have no relevant content for this request

- ● I have content to upload
- ○ I have no relevant content to upload

Upload one or more documents

67 — [ SELECT FILES ]

Note: maximum file upload size is 10MB. If you have files that exceed that size please use network folder.

Please provide an estimate of the hours spent collecting this content*

68 —

69 — [ Submit ]

COMPUTER-IMPLEMENTED SYSTEM AND METHOD FOR FACILITATING DATA SECURITY OF DOCUMENTS

CROSS-REFERENCE TO RELATED APPLICATION

This non-provisional patent application claims priority under 35 U.S.C. § 119(e) to U.S. Provisional Patent application, Ser. No. 62/949,831, filed Dec. 18, 2019, the disclosure of which is incorporated by reference

FIELD

The present invention relates in general to data security and, in particular, to a computer-implemented system and method for facilitating the security of data within documents.

BACKGROUND

Data security is extremely important to prevent the disclosure of sensitive information, which can result in theft and fraud. As more and more documents are generated and stored electronically, data breaches are of big concern to companies and organizations storing the documents, as well as the individuals identified by the documents.

Organizations that maintain documents with sensitive data must ensure that the information remains safe and inaccessible to prevent liability for unauthorized release of the information. For example, the Health Insurance Portability and Accountability Act provides guidelines for maintaining personally identifiable information in health care industries, while the Payment Card Industry Data Security Standard provides a standard for the handling of credit card information. Failure to follow such guidelines can result in legal liability.

Often times, sensitive documents must be provided to a third party, such as during the discovery phase of a pending litigation or during an investigation by an insurance company. To comply with established guidelines, sensitive data must be redacted prior to providing the documents to the third party. Additionally, many government agencies and private organizations require a fine-grained audit trail of the redactions to accompany the redacted documents.

Currently, redactions commonly occur manually or via a computer using search terms. However, the conventional methods for redaction fail to provide reliability assurance of the redaction, as well as maintain an audit trail of the redaction to identify who made the redaction, as well as when and why the redaction was made. Although audit trails may be manually constructed during or after the redaction, such a task requires large amounts of time and is usually incapable of conforming to the requirements of the government agencies and organizations.

Accordingly, there is a need for quick and accurate redactions of sensitive data in a large number of documents. Preferably, a redaction approval process is performed to ensure the accuracy of the redactions, while complying with audit requirements issued by government agencies and organizations.

SUMMARY

Documents that include sensitive data need to be protected to prevent disclosure of such information to unauthorized people to prevent identity theft, unauthorized use of credit cards, loss of money, and many other issues. The data can be secured through security features associated with the database or computer system which stores the data. Transmitting sensitive data from one source to another, while ensuring security can be difficult and can increase processing load, while decreasing processing speed of the computer system. Accordingly, redacting data prior to transmission of the sensitive data can increase security and processing speed of a computing device transmitting the data when the data is transformed to a particular format.

Redacting computer media, such as documents, containing sensitive data prior to providing the documents to a third party can prevent disclosure of the sensitive data to unauthorized individuals. Upon receiving a request for disclosure, such as a disclosure of documents with sensitive data, the documents are collected from one or more sources and converted to a common format. The collected documents are processed by identifying text, video media, or audio media specified by one or more of a search query, category, or redaction formula and the sensitive data of the documents or audio media transcripts is highlighted with a semi-opaque indicator as text for redaction. With respect to the video media, segments of the video data with sensitive data can be pixelated, while segments of audio data with sensitive information can be muted. A review of all highlighted or obfuscated text, video or audio is performed and once approved, the obfuscated sensitive data is finalized. For example, with respect to documents, the semi-opaque indicator is replaced with a fully opaque indicator. Meanwhile, data regarding the redactions is collected, including date, time, reasons for redaction, and reviewer, and used to generate an audit report that is associated with documents associated with the request for information. The report provides activities performed on every document reviewed as part of the disclosure request.

An embodiment provides a computer-implemented system and method for facilitating document information security. A request for documents is received and documents of different formats that satisfy the request are obtained from one or more sources. Source information is extracted from each obtained document. Each obtained document is converted to a common format and the source information is embedded within the common format for that document. At least a portion of text having sensitive data is identified within one or more of the obtained documents. The sensitive data is redacted by highlighting the text portion with a semi-transparent indicator. The highlighted text portion is obfuscated upon approval of the redacted sensitive data by changing the semi-transparent indicator to an opaque indicator. The redaction information is overlayed on the opaque indicator and the obtained documents are provided in response to the request.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 3 is a screenshot showing, by way of example, a solicitation request for documents based on a document request.

DETAILED DESCRIPTION

Documents in the possession of an individual or organization are often requested by a third party, such as an insurance company requesting doctor reports, a bank requesting financial information, or a citizen requesting public information from a government agency. Documents are also commonly requested during legal proceedings, between government agencies and constituents, or as a way to monetize data collected by companies in the ordinary course of business. Often times, the requested documents include sensitive data, which can be used to identify an individual.

Sensitive data is tightly regulated and individuals and organizations that collect and store the sensitive data must comply with guidelines implemented to protect individuals associated with the sensitive data. For example, the Health Insurance Portability and Accountability Act provides legislation for safeguarding medical information, while the Payment Card Industry sets standards for protecting payment transactions. Accordingly, documents with sensitive data must be carefully treated and when shared with third parties, the sensitive data must be redacted to prevent unauthorized disclosure of the data.

Common redaction methods include manual redaction and automatic redaction based on search terms. However, such redactions are time consuming and costly, and may not always be accurate, putting an organization at risk for unintentionally leaking unauthorized data. Further, an organization may have a difficult time identifying where or how the unauthorized leak occurred since no information is provided regarding the redactions. However, a complete end-to-end redaction system that facilitates the collection and redaction of documents, as well as generating and maintaining audit records of the redactions, ensures accuracy of the redactions and compliance with redaction and audit requirements.

Figure 1:
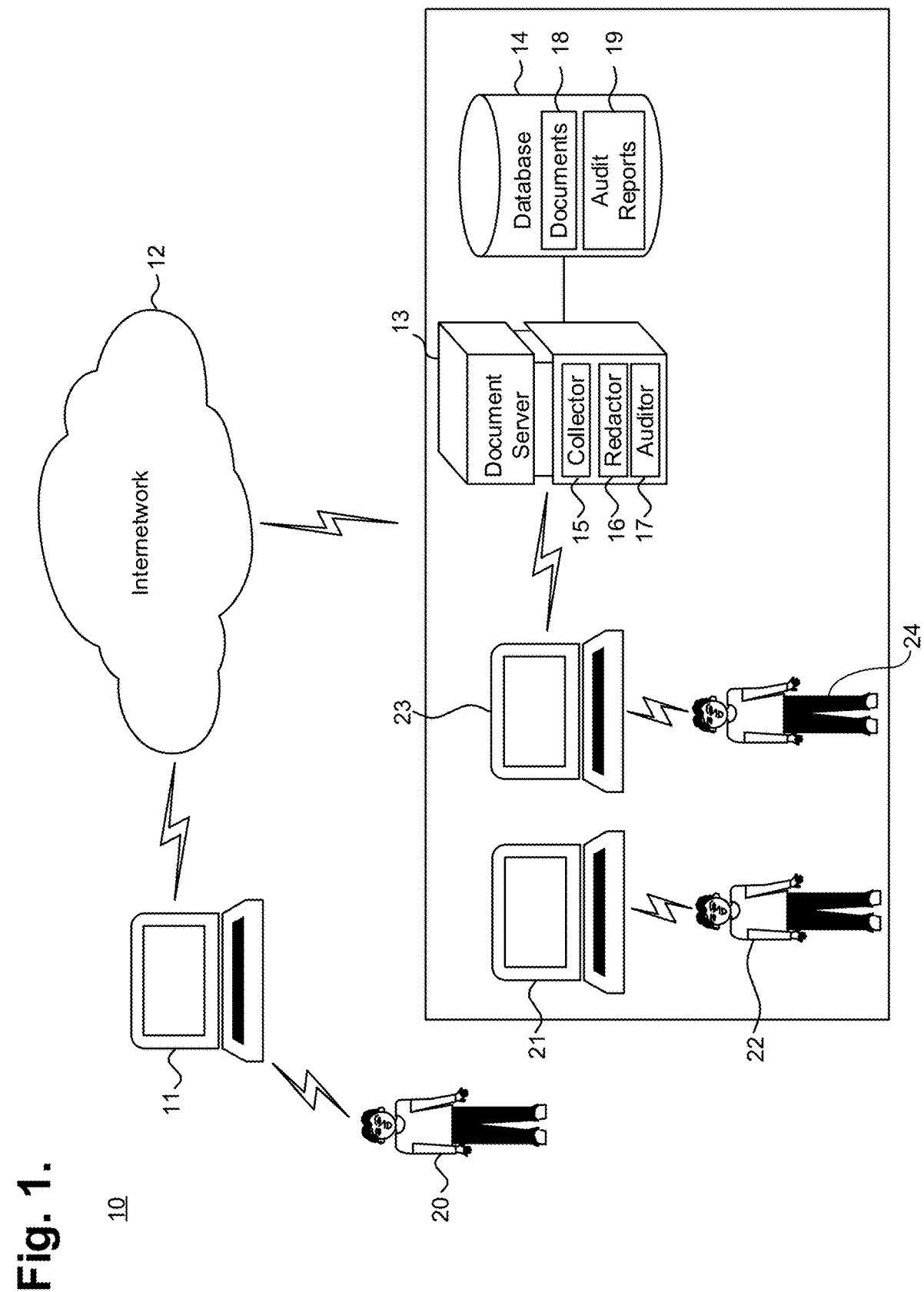
FIG. 1 is a functional block diagram showing a system for facilitating data security of documents, in accordance with one embodiment.

When sharing documents with a third party, any sensitive data must be accurately and completely redacted to prevent unintentional leaks of the data. FIG. 1 is a functional block diagram showing a system 10 for facilitating data security, in accordance with one embodiment. A requestor 20 provides a request for accessing and redacting one or more documents from one or more entities, such as an individual, organization or agency, via an internetwork 12, such as the Internet. A document server 13 receives and processes the request via a document collector 15, a redactor 16, and an auditor 17. The document server 13 can be interconnected to a database 14, which stores documents 18 and audit reports 19 for redactions within one or more of the documents.

The collector 15 gathers documents identified in the request from one or more sources that satisfy the request for documents. The sources can include individuals or organizations associated with one or more data servers interconnected to databases from which the documents are collected and provided to the document server 13. Alternatively, or in addition, documents can also be provided directly to the document server 13 from individuals via a computing device, such as a computer, mobile phone, laptop, or tablet, as well as by other computing devices. Specifically, an individual can upload documents to a shared file or attach documents to an electronic form or a message, such as an email message, as further described below with reference to FIG. 4. The system 10 can also operate via a cloud computing environment, which allows access to documents stored in the cloud. Further, one or more of the process steps can be performed by a server stored in the cloud.

The redactor 16 processes the received documents by converting the documents, which can be in different formats, to a common format. For example, all documents, whether emails, JPEG, or Microsoft Word documents, are converted to PDF documents. Further, other types of computer media, such as word documents of audio recording transcripts from audio and video media can be converted to PDF as well to allow processing of those types of computer media consistent with documents. Converting all media types of a common format allows viewing of associated content on a device of any type, whereas maintaining content of different media types in their native formats can prevent viewing and processing of that media type may require a special device programmed to view and process such media types.

In one embodiment, media identified via a search, such as documents, video or audio, can remain in their native format when no sensitive data is included in the media. However, media with sensitive data are converted to a common format and processed to identify and review the sensitive data.

Subsequently, one or more automated redaction mechanisms are applied to the documents to identify sensitive data, as well as other types of data that should be redacted. Identifying and redacting the documents are described below in further detail with respect to FIG. 5. During the redaction process, information regarding the redaction, such as date, time, and reasons for the redactions are collected for storing with each redaction, as well as for generating an audit report for each document.

The processed documents are then provided to a reviewer 22 via a computing device 11, such as a desktop computer, laptop, tablet, or mobile phone, as well as other types of computing devices. The reviewer 22 reviews at least a portion of the documents and the applied redactions. Based on the review, the reviewer can accept or decline the redactions, as well as make further redactions. Once the review is complete, the documents can be provided to a further reviewer 24 for further review on a computing device 23. Once approved, the audit report 19 is generated for the documents, which are provided to the user 20 in response to the request.

The servers and computing devices can include one or more modules for carrying out the embodiments disclosed below. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the computing devices and server can act as a specialized computer. For instance, when the modules are implemented as hardware, that particular hardware is specialized to perform message prioritization and other computers cannot be used. Additionally, when the modules are burned into read-only memory components, the computing device or server storing the read-only memory becomes specialized to perform the message prioritization that other computers cannot. Other types of specialized computers are possible. The various implementations of the source code and object and byte codes can be held on a computer-readable storage medium, such as a floppy disk, hard drive, digital video disk (DVD), random access memory (RAM), read-only memory (ROM) and similar storage mediums. Other configurations and types of modules and module functions are possible, as well as other physical hardware components.

Figure 2:
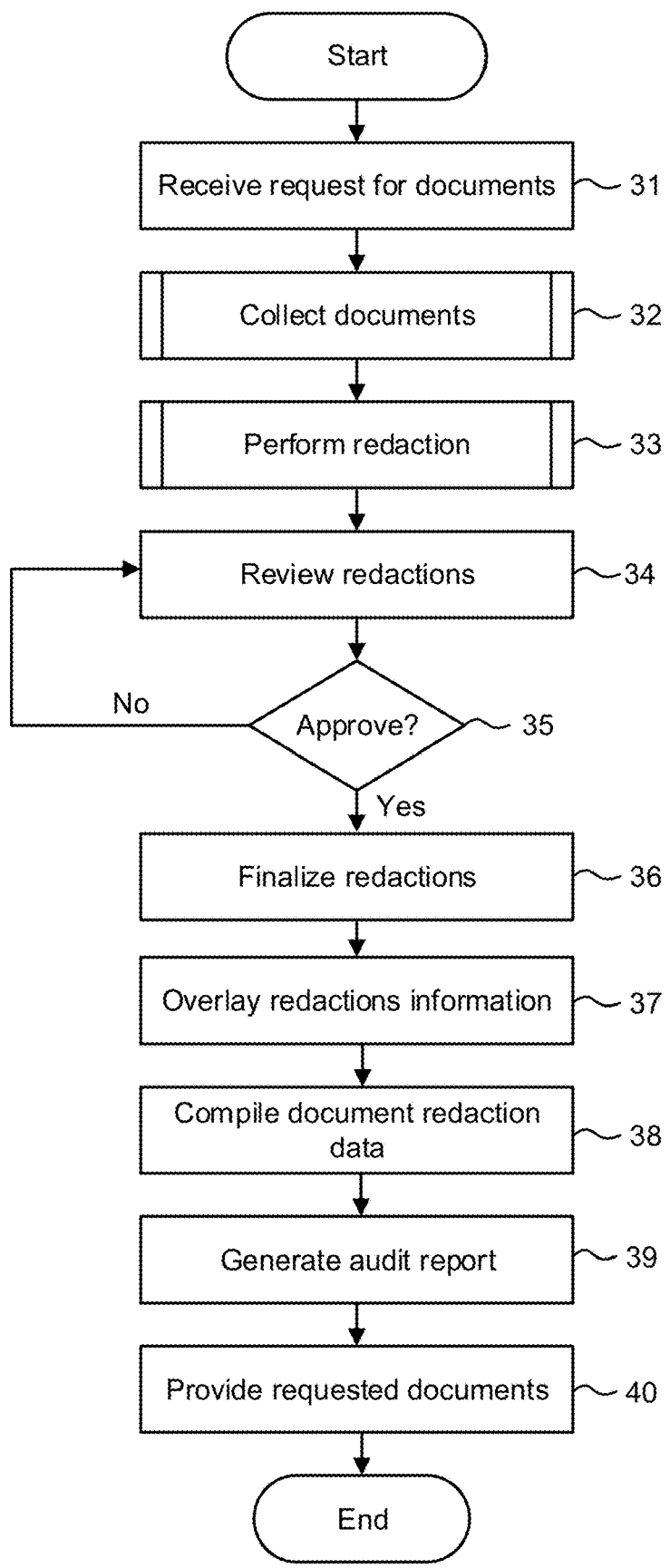
FIG. 2 is a flow diagram showing a method for facilitating data security of document data, in accordance with one embodiment.

An end-to-end content redaction process ensures redaction accuracy and provides auditing of the redactions made. FIG. 2 is a flow diagram showing a method 30 for facilitating data security of document data, in accordance with one embodiment. A requesting individual or entity submits a request for documents (step 31) and documents that satisfy the request are collected (step 32) from one or more sources. Specifically, documents that are relevant to a specific person, subject, or topic of business, as identified by the request, are gathered from one or more individuals within a common organization or different organizations. The documents may include sensitive data that cannot be disclosed to non-privileged parties that are unauthorized to access the information. The collected documents can be automatically obtained, such as via a document search, or provided by a third party in response to the request.

For example, emails can automatically be collected from email repositories of an organization or individual by searching the repositories to identify content relevant to the document request. Once identified, the emails are extracted and converted to a common format. The search can be performed based on a sender of the emails, sender email address, recipient email address, or word or phrases found within the email subject or body. Other criteria are possible, such as theme or category searches.

Alternatively, documents can be solicited from one or more sources. FIG. 3 is a screenshot showing, by way of example, a solicitation 60 for documents based on a document request. The solicitation 60 can be an electronic form that is transmitted to individuals within the same organization or different organizations, and can include informational fields for recipient email address 61, request tracking number 62, document request type 63, request summary 64, and additional record categories 65. Additionally, the solicitation electronic form 60 can include a field 66 to indicate whether documents relevant to the document request are available for accessing by the recipient. If documents are available, the documents can be uploaded via attachments to the electronic form 67. The solicitation 60 can also include a field 68 for providing an estimate of the time required to obtain all documents relevant to the request. Once completed by the recipient, the solicitation response is submitted via a submit button 69.

Figure 4:
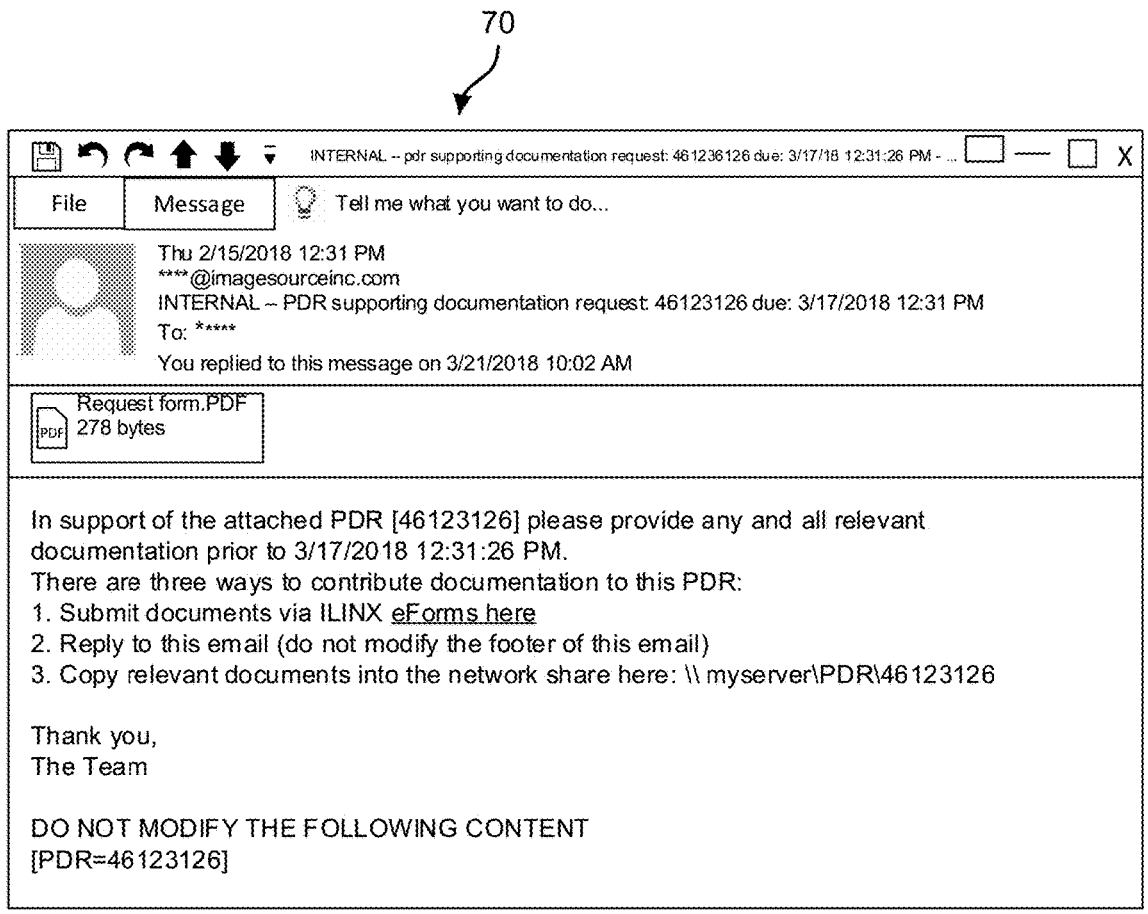
FIG. 4 is a screenshot showing, by way of example, a message for submitting documents in response to the solicitation request for documents of FIG. 3.

The solicitation can be provided to one or more recipients via a message, such as an email, text message or Instant Message. Other types of messages are possible. FIG. 4 is a screenshot showing, by way of example, a message 70 for submitting documents in response to the solicitation for documents of FIG. 3. A message 70, such as an email, can include instructions to a recipient for obtaining documents relevant to the document request. A solicitation form can be generated, as shown in FIG. 3, and accessed via a URL link in the message 70. The message 70 can also include information regarding the request for documents, a deadline for response, and instructions on how to provide documents that satisfy the request, such as submitting the documents via the form link, replying to the message, and uploading to the documents to a shared folder for automatic processing.

Documents can be uploaded via the electronic solicitation form, as described above with respect to FIG. 3. The uploaded documents are then delivered to a collection of documents upon submission of the form. Further, a link to a shared folder can also be included in the message and the documents in the shared folder are delivered and incorporated with the collection of documents. Documents can also be uploaded to the collection via a graphical user interface that organizes the documents within the collection based on a status of each document, as described below in further detail with respect to FIGS. 10 and 11. If no documents are provided in response to the solicitation request and the solicitation form has not been completed, reminders to submit the solicitation form or documents can be delivered on a predetermined time schedule, randomly, or manually.

All messages, document solicitations, responses, received documents, and reminders are tracked and copies of such correspondence are retained within the document collection. The tracking information, such as sender, recipient, and date and time of the sent or received messages, are stored in an audit log. Further, graphical depictions of the correspondence can be generated and displayed, as further described below with respect to FIGS. 9 and 10.

The collected documents can be received in different formats, such as Microsoft Word, Excel, email, file, cloud-based file, PDF, including image-based or searchable PDF, audio, video, or other formats. Also, encrypted documents can be unencrypted depending on format of the document.

During or after document collection, the documents can be converted to an appropriate common format, such as searchable PDF documents. Such transformation or conversion of the documents can occur automatically or manually. Returning to the above example regarding the email repository search and extraction, email content delivered to the non-privileged requesting party may necessitate the inclusion of email source information, which is not typically accessible through standard email software applications, but includes information that should be disclosed. The source information can be embedded, but not visible, within the HTML body of an email and can include detailed header information, such as protocols, server names and address, and encryption information. The source information can be extracted from the email and subsequently, combined into the email, which is converted into the common format, such as PDF, by this system. Alternatively, the source information can be separately converted into the common format and accompany the converted email document. For example, the source information can be added as a column in a redaction log for later reference.

Returning to the discussion with respect to FIG. 2, the collected documents are processed to identify and redact sensitive data. If identified, the sensitive data is redacted (step 33) and eventually, provided for further review (step 34) to ensure the sensitive data is correctly redacted. For example, the data selected for redaction should comply with guidelines or regulations relating to a type of the sensitive data. Additionally, the redactions are reviewed to ensure that all necessary redactions are made and that the sensitive data is completely redacted or redacted to satisfy such guidelines or regulations. Other types of review are possible.

If the redactions are approved during review, they are finalized (step 36) and information collected about each redaction can be overlaid (step 37) on the redacted text. The redaction information can include identification of an operator that generated the redaction, identification of the redaction reviewers, status of the redaction, and dates the redaction or redaction status changed. Other types of redaction information are possible.

Additionally, document redaction information can be compiled (step 38) for each document and the information can include an indication of whether the document includes one or more redactions, how many redactions are included, how many pages include redactions, a list of all redaction codes applied, and a list of all users that have modified or approved the redactions. Other types of information are possible.

The redaction codes serve to identify the reason why the content underlying the redaction is exempt from public disclosure, and along with rules associated with the codes, can differ between organizations and agencies. The user or reviewer can select an appropriate redaction code based on the information to which the redaction is being applied at the time of redaction. An audit report is generated (step 39) for each document based on the redaction information collected for that document. Prior to, simultaneously, or subsequent to generating the audit report, the collected and redacted documents are provided (step 40) to the requesting party.

During processing of the collected documents, each document is placed into a queue and assigned a status based on the queue in which the document is placed. Statuses of the collected documents can be provided within a user interface based on their current state of processing and the queue. Working documents include those documents that are being processed to identify and redact sensitive data, if necessary, as well as documents that have been rejected upon review of the redactions and returned for additional processing. Next, documents awaiting review or approval for release will be reviewed and actioned. If approved, the document will be released. Such documents may be approved if all the redactions are correctly made and leave no sensitive data accessible by any means. If the redactions in the documents are not approved, the document is rejected and returned to a working queue for correction or modification. Additionally, instead of being rejected, the document can be modified as needed directly within the approval queue and then approved for release.

Released documents are staged for delivery to the requestor of the documents. In one example, the released documents can be in an immutable image-based PDF format with redactions burned into the document, which obliterates all content under the redacted area to remove the content completely and permanently. Additionally, the assigned redaction code, as described above, can be overlaid on the redaction. Finally, released documents are delivered via a selected delivery channel and successfully delivered documents are marked, while those documents that are undeliverable are flagged and moved back to the released documents state to be delivered via an alternative delivery method.

Each document request package starts in a processing work queue where the collected documents are received. Each document is examined and redacted, if necessary. The document request package remains in the processing queue until all the documents have been processed to identify and redact sensitive data. The redacted document collection is then provided to the review and approve queue in which each redacted document is reviewed to ensure the redactions are accurate. If accurate, the document request package is approved for release. An individual document can be rejected and returned to the processing queue if further processing is required to correct or redact the document. In one embodiment, if one or more documents are rejected, the document request package must remain in the review and approval queue until all the documents have been approved. Once approved and all documents delivered to the requestor, the document request package can be routed to an archive queue. Alternatively, the documents need not be released and delivered as a collection and those documents that have been approved for delivery can be provided to the requestor, while the rejected documents can move back into the processing queue. In the archive queue, the documents within the document request package are accessible in a read-only mode.

Figure 5:
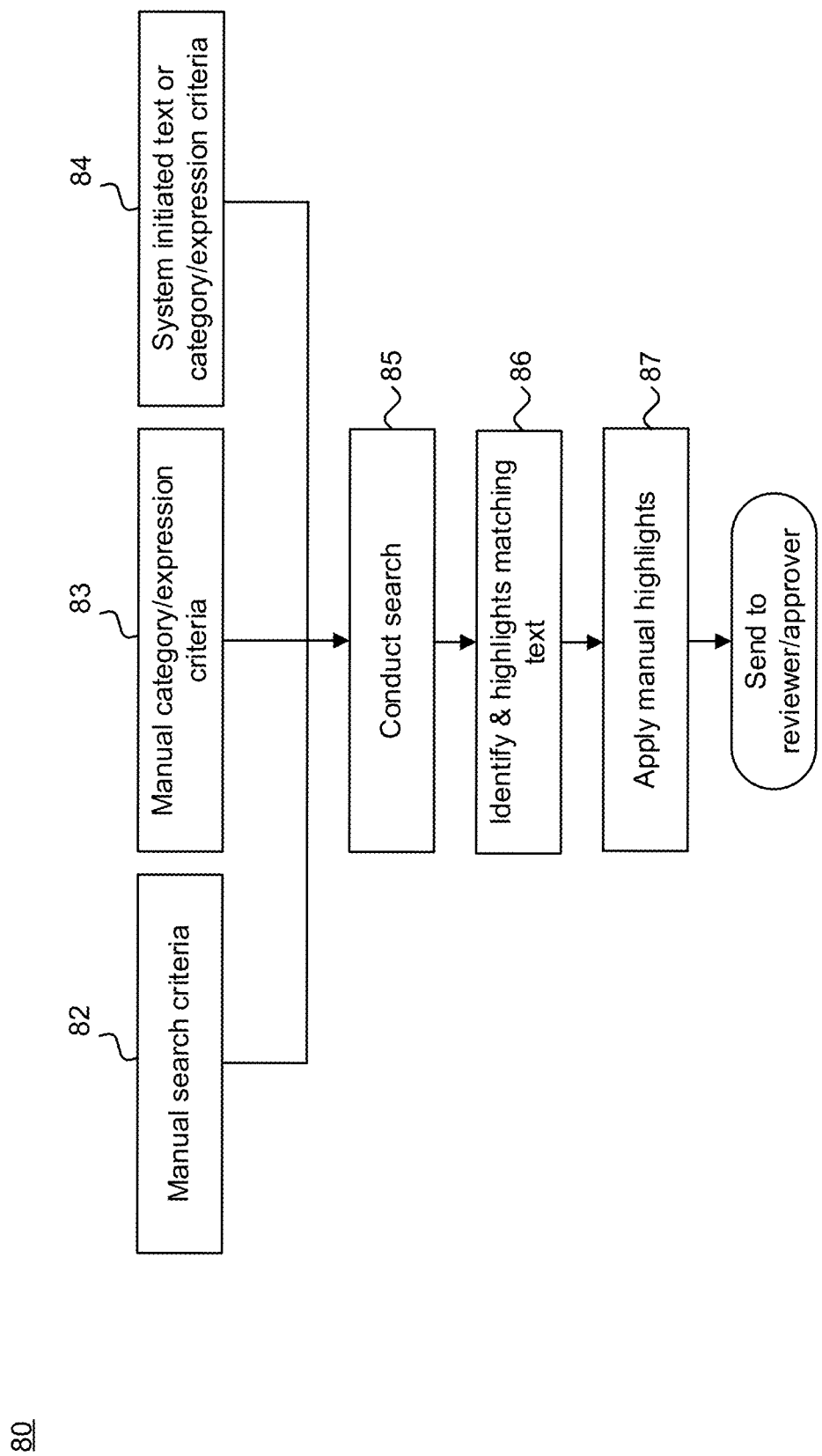
FIG. 5 is a flow diagram showing, by way of example, a method for performing redactions.

Redaction transforms privileged documents with sensitive data into a publicly consumable state and can occur in a two-stage process to ensure that any sensitive data is correctly and completely redacted. FIG. 5 is a flow diagram showing, by way of example, a method 80 for performing redactions. Text representing sensitive data within each document can be identified via one or more search methods, including conducting a word search (step 82) using manual search criteria, utilizing manual categories or expression criteria (step 83), and system automated redaction using either of the aforementioned mechanisms (step 84), as well as other methods. For a manual word search (step 82), a word or phrase is provided and all occurrences of that word or phrase within the document are identified. Search settings, such as match case and whole phrase only are possible, as well as other search settings.

For redaction categories (step 83), a category for search can be selected from a list of already created categories. Each category is associated with a name, a redaction code that is to be overlaid on top of the redaction, and a regular expression to identify desired content. A regular expression can include formatting criteria to identify potentially sensitive information. For instance, a social security number can be found based on the familiar pattern of xxx-xx-xxxx where 'x' is a number between 0 and 9. Other categories are possible, including date of birth, email address, and account number. System automated searches (step 84) are based on previous searches for sensitive data in the document collection. For instance, criteria and settings used for prior searches are recorded and utilized automatically by the system. When a collected document is opened, one or more previously applied redaction formulas for conducting a search for sensitive data in a document in the same document request package is selected. For example, a search for "Case 03939," which was used to search a previous document can be selected to search the current document under review.

Searches for sensitive data in each document in the document request collection are performed (step 85) to identify sensitive data using one or more of the methods described above. Once identified, the sensitive data is redacted by first identifying and highlighting (step 86) the text that matches the search conditions with a semi-opaque indicator so that the underlying text can be easily identified, but also viewed to allow review prior to finalizing the redaction. Specifically, all redactions are provided for further review to ensure that all sensitive data has been redacted and that the redactions are complete and justifiable. The review can be performed by an individual or alternatively, can be performed automatically. During review, for example, a social security number that is partially redacted may still be used to identify an individual depending on how many numbers have been redacted and thus, if too few numbers have been redacted, the redaction must be extended. Once the redactions have been reviewed and approved, the redaction is finalized by replacing the semi-opaque indicator with a fully opaque indicator to mask the sensitive data. This process can be performed automatically by the system once the document has been approved for release.

Manual redactions (step 87) can occur prior to, simultaneously with, or subsequent to automatic redaction via a computer processor. In one embodiment, the manual redactions can be performed by prompting a user or operator to select a redaction code via the user interface, which is placed on top of the resulting redactions. The identified text to be redacted is first highlighted with a semi-opaque indicator and later changed to a fully opaque indicator upon approval of the text to be redacted.

Figure 6:
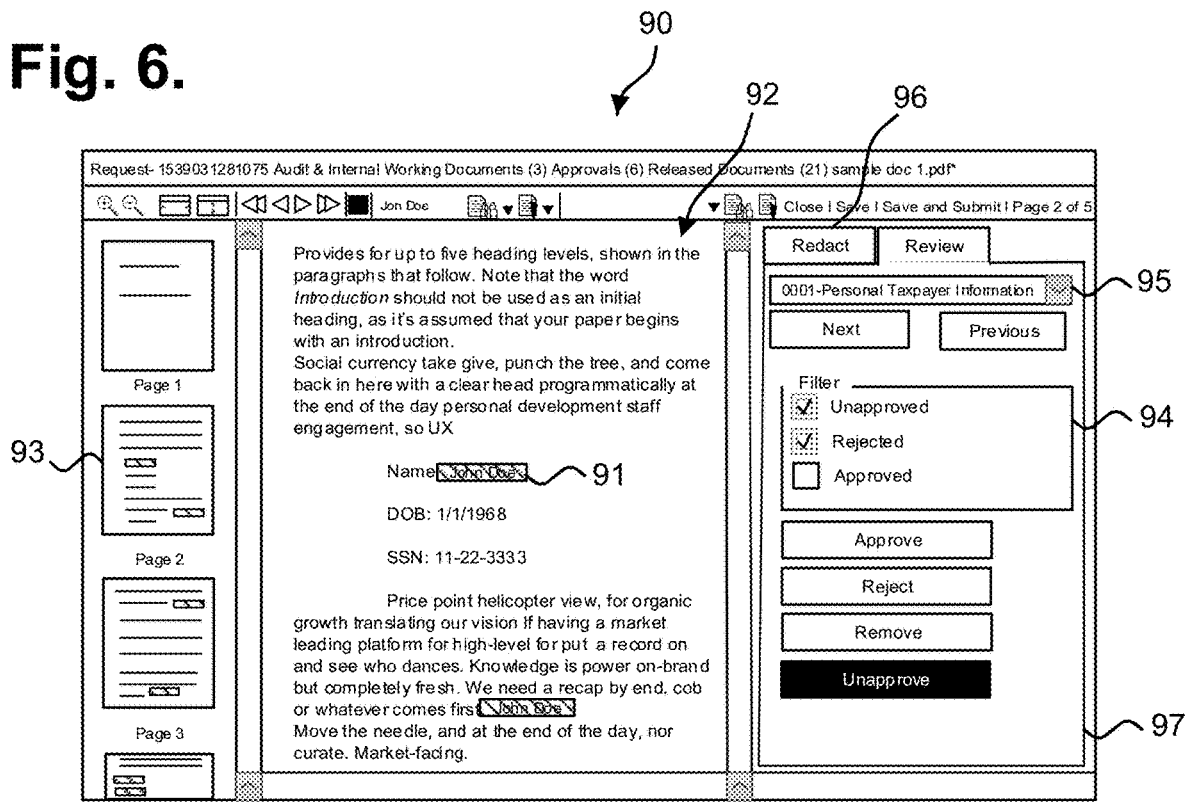
FIG. 6 is a screenshot showing, by way of example, a section of redacted text highlighted by a semi-opaque indicator.

The documents can be displayed with the redactions for review. FIG. 6 is a screenshot showing, by way of example, an interface 90 for a collected document showing a section of redacted text highlighted by a semi-opaque indicator. The interface 90 can include a page 92 of a document displayed in the center of the interface. A search for the term "john doe" identified two occurrences, which are each highlighted with a semi-opaque indicator 91 that allows the underlying text to be visible through the indicator. A list 93 of all pages in the document can be displayed on the left side of the displayed page. The page in the center display can be highlighted in the list of page thumbnails to indicate the page's position within the document. To the right of the displayed page, a document editor panel 97 can be displayed. The document editor panel 97 can include search filters 96 for redactions and status values 94 of the redactions. Under a review tab for redaction status, the redaction for an occurrence 91 of "john doe" appears to be selected and the status of the redaction is determined to be pending. The reviewer can choose to approve, reverse approval, reject, or remove the selected redaction, such as when the redacted information does not qualify as information exempt from public disclosure. If rejected or unapproved, the document will be returned for further processing to ensure the redaction is correct. However, prior to returning the document, the remaining redactions can be reviewed to ensure that all other redactions of "john doe" are approved, as well as redactions of other text in the document.

A code associated with the selected redacted text in the document page can be displayed in the document editor panel 97. For example, the code for the selected occurrence of "john doe" is identified as personal taxpayer information, which is associated with code 0001 95. Upon review of all the pages in the document, the document can be approved and another document in the collection can be selected for review.

Figure 7:
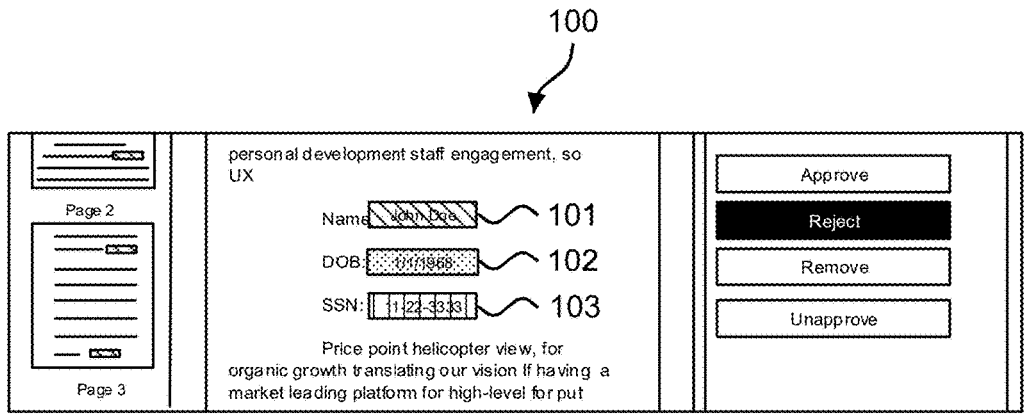
FIG. 7 is a screenshot showing, by way of example, redacted text with different statuses.

In one embodiment, the semi-opaque indicators can be color coded to identify a status of the redaction. FIG. 7 is a screenshot showing, by way of example, a document page 100 with redacted text having different statuses. As described above with respect to FIG. 6, the name 101 "john doe" has been highlighted with a semi-transparent indicator. Additionally, a date of birth 102 and social security number 103 have also been highlighted with a semi-transparent indicator. In one example, the redaction or highlighting of "john doe" has been approved and is colored green, while the indicator for the date of birth is red, which can mean that the redaction was rejected and the indicator covering the social security number is colored purple to indicate a pending review status. Other colors and redaction statuses are possible.

Figure 8:
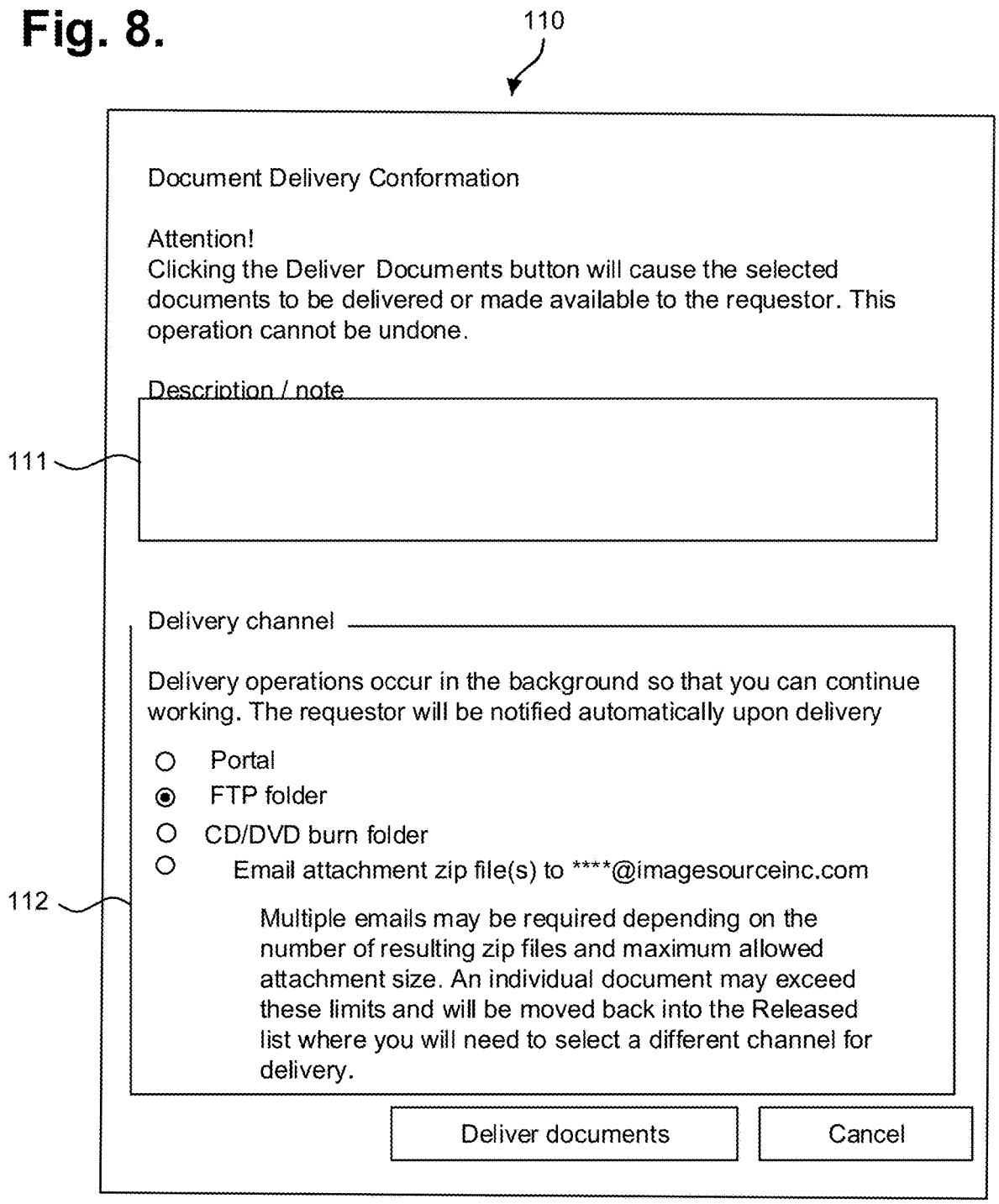
FIG. 8 is a screenshot showing, by way of example, a notice of documents to be delivered to a requestor of the documents.

The collection of documents that satisfy a document request of a non-privileged third party can be delivered once all redactions have been approved. The document collection can be delivered at a single time or subsets of the collection can be delivered at different times and through different channels. FIG. 8 is a screenshot showing, by way of example, a notice 110 of documents to be delivered to a requestor of the documents. The notice can include a description 111 of the document collection to be delivered and the delivery channel 112 selected for accessing the documents upon receipt of the notice 110 by the requestor. The delivery channels can include a secure web-based portal where document requestors can access documents delivered using an active account. Another delivery channel can include an FTP or SFTP folder. Specifically, the URL or address of the folder is delivered to the requestor via an automated message, such as email, and the user can access the documents in the folder via the URL or address. The documents can also be delivered via a DVD, USB drive or other physical media, as well as via an attachment to a message, such as an email message. When delivered by email attachment, one or more zip files, in which the documents are placed, can be generated and emailed to the requestor. A minimum number of zip files required to deliver the document collection can be automatically generated. If the documents reach a configurable maximum attachment size, a notice will be provided and an alternative channel for delivery can be suggested. Additionally, a configurable maximum number of emails to the document requestor can be specified and any delivery of the document collection that require more than the maximum number of emails can trigger a notification that another delivery channel needs to be selected.

The documents can be delivered as image-based PDF documents with no underlying text data layer; however, the documents can also be converted to a searchable PDF format, which includes the underlying text data layer minus all redacted content. The notice with the selected method for accessing the documents can be provided via electronic delivery, such as email, and can include instructions for accessing the documents via one or more of the delivery channels.

Once all documents within the document request collection have been approved and redactions finalized, an audit report is generated for the document collection. The audit report can include a complete list of all submitted request criteria, such as the requestor name, phone, email, date, type, and details of the request, as well as a list of key parameters and milestones. Key parameters in the audit report can include a summary table of delivered documents, such as document count, redacted document count, total page count, redacted page count, total size of documents delivered, and total redaction count. An internal email solicitation summary of all emails sent for the documents requested, the solicitation and response dates, and a number of documents provided for each solicitation and a total of all documents provided in response to all solicitations for the requested documents can also be included in the audit report. Additionally, the audit report includes all key milestones for the request collection with entries for every change made to the documents in the collection, as well as when the changes were made and by whom, a released document summary that includes a list of every document delivered, a thumbnail of the first page, a description of the document, a list of all redaction codes applied in the document, a list of all operators that contributed to the processing of the document, the release date of the document collection and the delivery channels.

Figure 9:
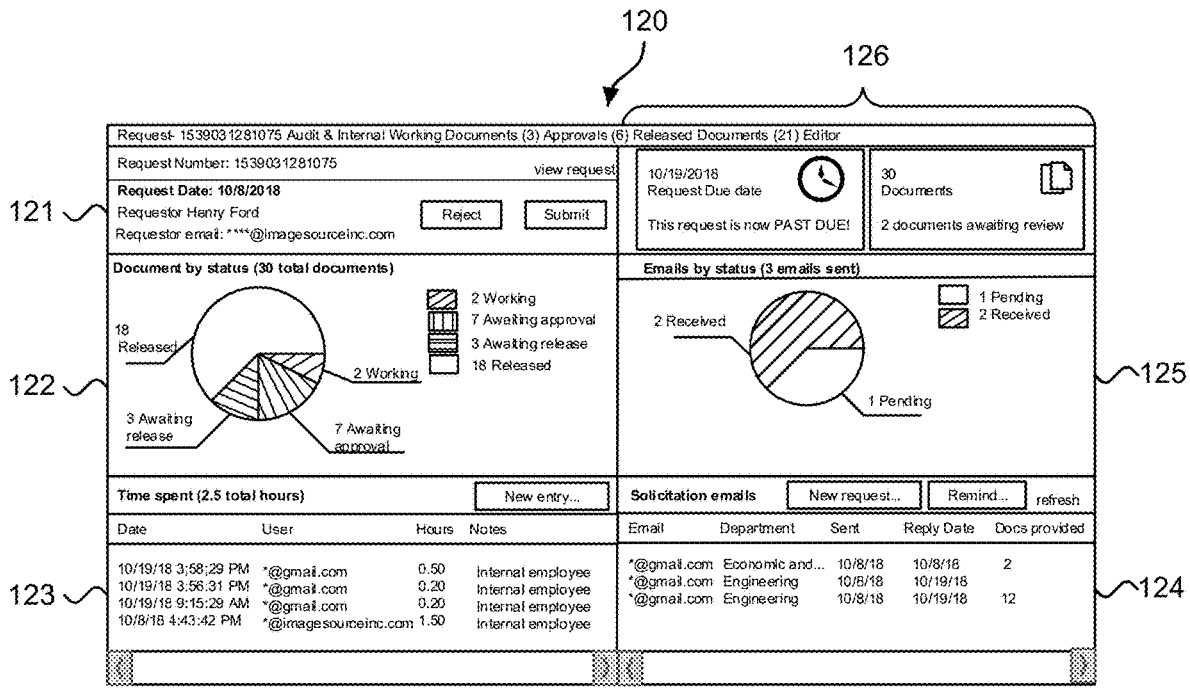
FIG. 9 is a screenshot showing, by way of example, a dashboard for displaying document redaction status.

A dashboard panel for each document request package can be displayed via a user interface to provide real-time statistics and information as to a state of the collection. FIG. 9 is a screenshot showing, by way of example, a dashboard 120 for displaying document redaction and review/approval status. The dashboard displays information for a particular document request, in this example, Request Number 1539031280175. The request number can be displayed in a request information box 121, which also includes the request date, identification of the requestor, and contact information for the requester. Additionally, buttons for rejecting or submitting the request can also be displayed depending on the current state of the document request package. A document status box 122 includes information regarding a status of each document in the collection gathered in response to the request. Each document is assigned a status, as described above, and a summary of the document statuses can be displayed in a pie chart, bar graph, list, or other display. In the current example, documents were collected in response to the request and 18 of the documents have been released as results, 3 are awaiting release, 7 are awaiting approval of the redactions, and 2 are currently being processed for redactions.

The dashboard 120 can also include time tracking 123 for the amount of time required to gather and process all of the documents in the collection. In one example, the time keeping can include a total amount of time spent, as well as separate entries, including a date on which time was spent gathering the documents, identification of the user that collected the documents, an amount of time spent, and notes regarding that document collection. Other fields and displays are possible.

A status of each email sent for soliciting documents from an individual can be maintained and displayed by the dashboard in an email status area 125. The email statuses can be displayed via a pie chart, bar graph, line graph, list, or other displays. In the current example, two emails were received and one email is pending response. An email list 124 can also be provided in the dashboard to provide further information about each email for which a status was provided 125. The status email box 125 can include fields for email address of each recipient to whom a request for documents was provided via a solicitation email, a department or title for each recipient, a date on which the email with the document request was sent, whether a reply was provided by the recipient, a date on which the reply was received, and a number of documents provided with the reply. Other fields are possible. The dashboard 120 can also include a due date by which all documents must be collected, processed, and delivered to the requestor, as well as a summary of the status for all the documents in the collection.

Figure 10:
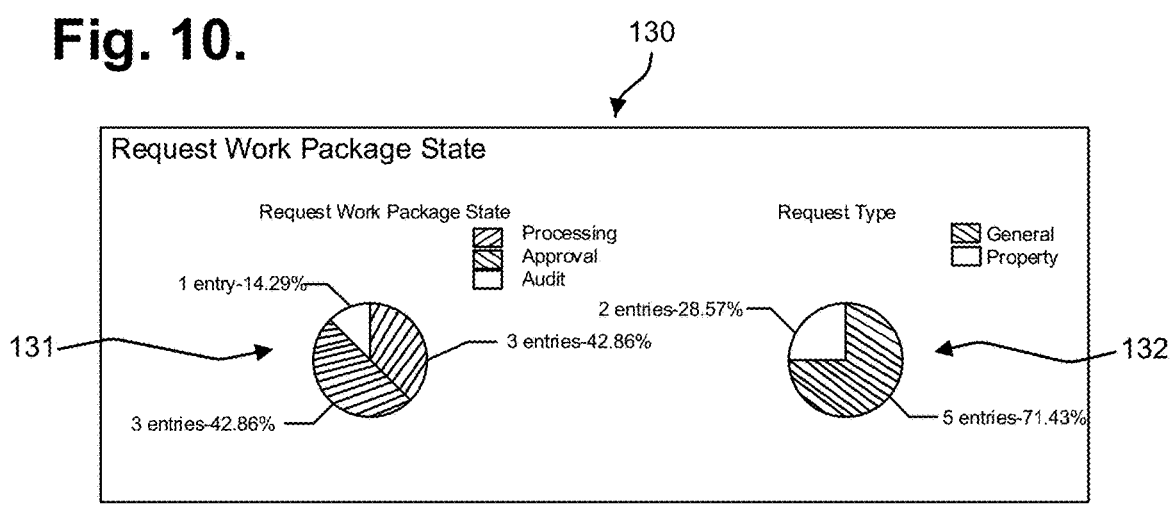
FIG. 10 is a screenshot showing, by way of example, a dashboard for document requests and document status.

Information regarding a status of all document request packages in the system can be displayed in a dedicated dashboard. FIG. 10 is a screenshot showing, by way of example, a dashboard 130 for document requests that shows the current status of all document request packages in the system and the breakdown of request types. The dashboard can display statuses for all requested document collections 131 and document requests received 132 via a list, a pie chart, a bar or line graph, a table, or another type of display. The requested document collection status shows that there is one request package in the audit queue, three request packages in the approval queue, and three request packages in the processing queue. The request types chart 132 shows two requests are regarding property, while five requests are general.

In a further embodiment, the data security system can also be used to review and redact audio and video files manually or automatically. For audio files, a search for sensitive data using one or more of a term, phrase, expression, or category, is performed on the recorded audio. Sensitive data matching one or more of the term, phrase, expression or category is extracted and associated with a timestamp. In a further embodiment, the matching sensitive data can be muted, rather than extracted from the audio file.

For video files, a search is applied to identify sensitive data, such as faces, driver's licenses, license plates, or other sensitive data, and the identified sensitive data can be redacted by blurring, pixelating, or blocking out the video content for the desired region. For example, a particular individual's face is selected for redaction. A search is performed within the video clip for the individual's face and all occurrences can be blurred. Additionally, audio can be redacted from the video, such as a name of the individual with the blurred face. The redacted data can be reviewed and confirmed or the redaction can be removed or edited to cover more or less data.

Further, a transcript of an audio or video file can be generated and any sensitive data is identified in both the text transcript and the audio or video file for redaction. For instance, a search is conducted for a social security number within a video file and a transcript of the video file. Once identified, the social security number is redacted by muting the social security number in the video clip and by obfuscating the social security number in the text transcript. The obfuscated data can be reviewed and confirmed or the obfuscation can be removed or edited to cover more or less data.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for facilitating document information security, comprising:
   a database to maintain documents; and
   a server comprising a central processing unit, memory, an input port to receive one or more of the documents from the database, and an output port, wherein the central processing unit is configured to perform the following steps:
   obtaining documents that satisfy the request from one or more sources, wherein the documents comprise different formats;
   extracting source information from each obtained document;
   converting each obtained document to a common format and embedding the source information with the common format for that document;
   identifying within at least one of the obtained documents, one or more portions of text comprising sensitive data;
   redacting the sensitive data by highlighting the text portions with a semi-transparent indicator;

determining approval of the redacted sensitive information for complete redaction;
obfuscating the highlighted text portions upon the approval of the redacted sensitive data, comprising:
changing the semi-transparent indicator of only the highlighted text portions to an opaque indicator; and
overlaying redaction information on the opaque indicator; and
providing the obtained documents in response to the request.

2. The computer-implemented system according to claim 1, wherein the central processing unit collects the obtained documents, comprising:
transmitting solicitation emails to one or more individuals comprising the request for documents;
receiving from at least one of the individuals at least one document that satisfies the request.

3. The computer-implemented system according to claim 2, wherein the documents from each individual can be provided via one of attachment to an electronic form, attached to the solicitations email for that individual, and uploaded to a shared folder.

4. The computer-implemented system according to claim 1, wherein the central processing unit color-codes the semi-opaque indicator based on a status of the redacted sensitive data.

5. The computer-implemented system according to claim 1, wherein the redaction information comprises one or more of an operator that generated the redaction of the sensitive data, an operator that modified the redaction of the sensitive data, dates of any changes to the sensitive data redaction, and a status of each change to the sensitive data redaction.

6. The computer-implemented system according to claim 1, wherein the central processing unit collects document information for each document comprising whether the document includes one or more sensitive data redactions, how many redactions of sensitive data are included in the document, a number of pages in the document with redactions of sensitive data, a list of redaction codes associated with the sensitive data redactions in the document, and a list of all operators that have modified one or 8 more of the sensitive data redactions.

7. The computer-implemented system according to claim 1, wherein the central processing unit generates an audit report for the obtained documents and provides the audit report with the obtained documents.

8. The computer-implemented system according to claim 7, wherein the audit report comprises information collected for the obtained documents, including an identity of the document requestor, a summary of the obtained documents, a summary of emails soliciting the obtained documents, changes made to the obtained documents, and details regarding delivery of the obtained documents.

9. The computer-implemented system according to claim 1, wherein the central processing unit maintains each of the obtained documents in a queue depending on a status of that obtained document.

10. A computer-implemented method for facilitating document information security, comprising:
receiving a request for documents;
obtaining documents that satisfy the request from one or more sources, wherein the documents comprise different formats;
extracting source information from each obtained document;
converting each obtained document to a common format and embedding the source information with the common format for that document;
identifying within at least one of the obtained documents, one or more portions of text comprising sensitive data;
redacting the sensitive data by highlighting the text portions with a semi-transparent indicator;
determining approval of the redacted sensitive data for complete redaction;
obfuscating the highlighted text portions upon the approval of the redacted sensitive data, comprising:
changing the semi-transparent indicator of only the highlighted text portions to an opaque indicator; and
overlaying redaction information on the opaque indicator; and
providing the obtained documents in response to the request.

11. The computer-implemented method according to claim 10, further comprising: collecting the obtained documents, comprising:
transmitting solicitation emails to one or more individuals comprising the request for documents;
receiving from at least one of the individuals at least one document that satisfies the request.

12. The computer-implemented method according to claim 11, wherein the documents from each individual can be provided via one of attachment to an electronic form, attached to the solicitations email for that individual, and uploaded to a shared folder.

13. The computer-implemented method according to claim 10, further comprising:
color-coding the semi-opaque indicator based on a status of the redacted sensitive data.

14. The computer-implemented method according to claim 10, wherein the redaction information comprises one or more of an operator that generated the redaction of the sensitive data, an operator that modified the redaction of the sensitive data, dates of any changes to the sensitive data redaction, and a status of each change to the sensitive data redaction.

15. The computer-implemented method according to claim 10, further comprising:
collecting document information for each document comprising whether 4 the document includes one or more sensitive data redactions, how many redactions of sensitive data are included in the document, a number of pages in the document with redactions of sensitive data, a list of redaction codes associated with the sensitive data redactions in the document, and a list of all operators that have modified one or more of the sensitive data redactions.

16. The computer-implemented method according to claim 10, further comprising:
generating an audit report for the obtained documents; and
providing the audit report with the obtained documents.

17. The computer-implemented method according to claim 10, wherein the audit report comprises information collected for the obtained documents, including an identity of the document requestor, a summary of the obtained documents, a summary of emails soliciting the obtained documents, changes made to the obtained documents, and details regarding delivery of the obtained documents.

18. The computer-implemented method according to claim 10, further comprising:
maintaining each of the obtained documents in a queue depending on a status of that obtained document.

19. The computer-implemented system according to claim 1, wherein obtained document comprising the text portions with the semi-transparent indicator are displayed via a user interface comprising at least one of a search filter and redaction status values of the text portions.

\* \* \* \* \*